United States Patent [19]

Furman

[11] Patent Number: 4,591,203
[45] Date of Patent: May 27, 1986

[54] MODULAR WINDOW ASSEMBLY
[75] Inventor: Herbert Furman, Southfield, Mich.
[73] Assignee: General Motors Corporation, Detroit, Mich.
[21] Appl. No.: 596,038
[22] Filed: Apr. 2, 1984
[51] Int. Cl.⁴ .......................... B60J 1/00; F16B 13/04
[52] U.S. Cl. .................... 296/201; 296/84 A; 296/84 D; 296/93; 52/716; 52/511; 411/510; 411/44
[58] Field of Search ............... 296/84 R, 84 A, 84 D, 296/201, 93; 52/716, 718, 208, 511; 411/508-510, 40, 41, 44, 45

[56] References Cited
U.S. PATENT DOCUMENTS

| | | | |
|---|---|---|---|
| 2,479,436 | 8/1949 | Vigmostad | 52/208 |
| 2,671,541 | 3/1954 | Kramer | 52/716 |
| 3,494,244 | 2/1970 | Wayland | 411/510 |
| 3,841,682 | 10/1974 | Church et al. | 52/716 |
| 3,897,967 | 8/1975 | Barenyi | 52/718 |
| 4,072,340 | 2/1978 | Morgan | 296/84 R |
| 4,139,234 | 2/1979 | Morgan | 52/208 |
| 4,434,593 | 3/1984 | Horike et al. | 296/93 |

FOREIGN PATENT DOCUMENTS

| | | | |
|---|---|---|---|
| 1317354 | 1/1963 | France | 411/510 |
| 623596 | 5/1949 | United Kingdom | 296/93 |
| 678891 | 9/1952 | United Kingdom . | |

Primary Examiner—Robert B. Reeves
Assistant Examiner—Dennis H. Pedder
Attorney, Agent, or Firm—Patrick M. Griffin

[57] ABSTRACT

A modular window assembly includes a glass panel with a peripheral molded PVC frame having an undersurface engageable with a pinchweld flange defining a window opening in a vehicle. A plurality of cylindrical, finned PVC studs are integrally molded to the PVC frame undersurface and are alignable with slots through the pinchweld. A central passage extends axially through each stud, most of the way, but not all the way therethrough. The diameter of each stud is slightly larger than each pinchweld slot. A pin in each central passage, when pushed, stretches the studs, decreases their diameter so that they pass through the pinchweld slots. Releasing the pins lets the studs resiliently return to their original shape to retain the window assembly to the vehicle.

2 Claims, 4 Drawing Figures

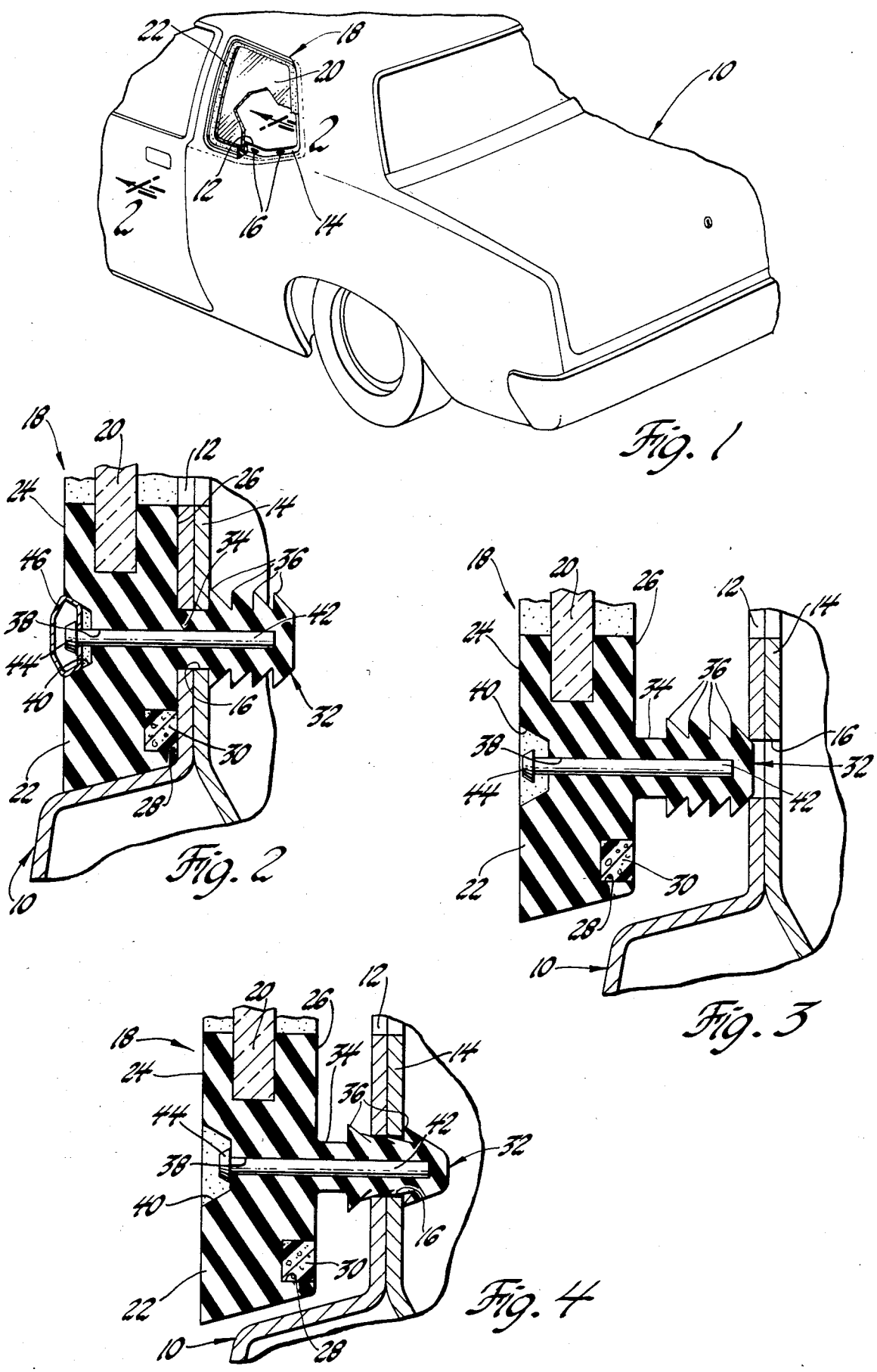

MODULAR WINDOW ASSEMBLY

This invention relates to window assemblies in general and specifically to a modular window assembly for a vehicle or the like.

BACKGROUND OF THE INVENTION

Modular or unitary vehicle windows, that is, window assemblies in which the window glass, gasket or frame, and at least part of the fastening means are molded or otherwise held together as a separately handled unit, are old in the art. The British patent specification No. 678,891 shows a window unit made up of a glass panel and a peripheral rubber gasket with an embedded peripheral metal frame therein that includes threaded holes. The unit is set into a window opening defined by a pinchweld and screws are threaded by an operator inside the vehicle through holes in the pinchweld into the threaded holes in the frame to retain the unit to the vehicle. The U.S. Pat. Nos. 4,072,340 and 4,139,234 show various embodiments of a modular window assembly which essentially reverses the structure of the British specification by molding studs into the gasket, inserting the studs through matching holes in the pinchweld, and threading nuts on the studs from inside the vehicle. The disadvantage of all these structures is the necessity for an operator inside the vehicle to do the final installation. With modern, robot assembly methods it is desirable to have an assembly that can be installed from outside the vehicle entirely.

SUMMARY OF THE INVENTION

The invention provides a modular window assembly which can be installed entirely from the exterior of the vehicle, as well as providing other advantages.

In the preferred embodiment, the modular window assembly of the invention includes a glass window panel with a frame of resilient plastic material, such as PVC, molded around and to the peripheral edge thereof, sized to fit within a conventionally defined pinchweld flange window opening in a vehicle body. The molded frame has an outer surface accessible from outside the vehicle and an undersurface that is engageable with the pinchweld flange. The flange includes a plurality of localized openings, such as slots or holes, therethrough.

The undersurface of the molded frame also includes, at spaced locations corresponding to the location of the pinchweld slots, integrally molded resilient cylindrical studs having a series of axially spaced flexible ribs or fins. The outer diameter of the fins is larger than that of the pinchweld openings. Each stud also includes an axial passage which extends from the outer surface of the frame to an inner closed end wall of the stud. Each passage receives a separable push pin which engages the inner closed end wall of the stud. Each pin has a head which is recessed within a molding receiving channel in the outer surface of the molded frame.

When the window assembly is placed into the vehicle body window opening, the tapered inner ends of the studs are aligned with the pinchweld openings but cannot pass through the openings because of their larger diameter. When the pins are pushed into their passages from outside the vehicle, they act against the inner closed end wall of the passages and stretch or elongate the studs. This decreases the stud diameter and allows the stud and one or more fins to pass through the pinchweld openings. When the frame undersurface has engaged the pinchweld, installation of the assembly is complete and the pins are released. This allows the inherent resiliency of the studs to retract the studs to their original length and engage one of the fins with the inner surface of the pinchweld to retain the window assembly to the vehicle.

The structure of the invention provides other advantages, as well. The resilience of the stud provides a rattle free attachment tolerance or play in the stud-slot alignment. With proper stud-slot sizing the assembly may be made easily removable, especially if a bead of adhesive, rather than just sealant, is used. In that case, the mechanical attachment provided by the studs need be only temporary, only enough to allow the adhesive to set. Even if a totally mechanical attachment is used with the stud-slot interengagement being tight and difficult to remove, the pin is removable, which would leave the stud easy to cut, as by a wire.

It is, therefore, an object of the invention to provide a modular window assembly which may be installed entirely from the exterior of the vehicle.

It is a further object of the invention to provide such a modular window assembly in which the fastening means is comprised of resilient studs molded from the same material as the molded frame of the assembly with no separate members or fasteners molded into or embedded in the molded frame.

It is another object of the invention to provide such a modular window assembly in which the resilient studs may, with access only from the exterior of the vehicle, be stretched and elongated to fit through aligned slots in a flange of a vehicle body opening to retain the window assembly to the flange.

DESCRIPTION OF THE PREFERRED EMBODIMENT

These and other objects and advantages will appear from the following written description and drawings in which:

FIG. 1 is a perspective view of a portion of a vehicle body showing a rear quarter window in which the invention is embodied.

FIG. 2 is an enlarged sectional view taken along the line 2—2 of FIG. 1.

FIG. 3 is a view from the same perspective as FIG. 2 showing the window assembly just before it is assembled to the body.

FIG. 4 is a view from the same perspective as FIG. 2 showing the window assembly in the process of being attached to the vehicle body.

Referring first to FIG. 1, a vehicle body designated generally at 10 has a window opening 12 defined by a peripheral pinchweld flange 14 which includes, at spaced locations therealong, a plurality of circular openings or slots 16. As disclosed, window opening 12 is a rear quarter, although the invention may be embodied in any fixed window. Window opening 12 is closed by a modular rear quarter window assembly 18 of the type having a glass window panel 20 which has a molded frame 22 formed around its peripheral edge.

Referring next to FIG. 3, an enlarged sectional view of part of molded frame 22 and the peripheral edge of window panel 20 are shown with window assembly 18 being aligned with window opening 12 prior to its installation adjacent the opening. Molded frame 22 is formed of PVC or similar material and has an outer surface 24 which is accessible from outside vehicle body 10 and an undersurface 26 which faces the interior of vehicle 10. A peripheral groove 28 formed along the outer edge of undersurface 26 receives a bead of sealant or adhesive 30. This much is typical of a modular window assembly. What is desired is a way of fastening window assembly 18 to the pinchweld flange 14 without an operator on the inside of vehicle body 10. This is provided by the fastening system of the invention which is combined therewith, described below.

Molded integrally with the undersurface 26 of molded frame 22 are a plurality of resilient studs designated generally at 32 equal to the number of slots 16 in the pinchweld and alignable therewith. Each stud 32 is generally cylindrical in shape, having an elongated body 34 and a series of axially spaced flexible or resilient integral fins 36 on the outer surface thereof. The diameter of body 34 is slightly larger than the diameter of slot 16. The distance from undersurface 26 to the first fin 36 is slightly less than the thickness of pinchweld flange 14. Passing into the center of body 34 from the outer surface 24 of frame 22 is a cylindrical passage 38. Passage 38 runs through most of the length of body 34, but not entirely therethrough so that the stud has a closed end. An outer peripheral groove 40 intersects the passages 38, for a reason to be described below, but is not strictly necessary to the practice of the invention. Insertable in each passage 38 is a separable, rigid push pin 42 of metal or other suitable material which fits snugly, but movably, within passage 38. Pin 42 is of a length such that, when it is inserted all the way to the closed end of the stud at the bottom of passage 38, its head 44 is spaced from the bottom of outer groove 40 by a predetermined amount to be described below. Pin 42 may be inserted in passage 38 after the process of molding frame 22, or, with a suitable release agent, it may be placed in the mold with frame 22 and stud 32 formed around it. The release agent will assure that pin 42 is completely removable, that is, not permanently embedded within or molded within frame 22.

Referring next to FIG. 4, a pressing force has been applied to head 44 of the pin 42 by any suitable tool, not shown. Such force presses head 44 into contact with the bottom of outer groove 40 to stretch and elongate body 34. Consequently this force in the preferred embodiment effectively decreases the diameter of body 34 and fins 36 to allow the stud and fins to be inserted through slot 16 in the pinchweld so that the inner surface of the frame can engage the outer surface of the pinchweld flange and one of the fins of the stud can engage the inner surface of the pinchweld flange to retain the window assembly thereto. The spacing of head 44 from the bottom of outer groove 40 is sufficient to allow enough elongation of body 34 to cause this decrease in body diameter.

Referring next to FIG. 2, body 34 has continued to move through slot 16 as pin 42 is pushed until the undersurface 26 has engaged the outside of flange 14 along with bead 30. Once this positive stop has engaged, the pressure is released from pin 42, and body 34 returns substantially to its original shape. The resilient engagement of body 34 with the edges of slot 16 may retain window 18 to peripheral flange 14. This retention is assisted by the engagement of the first fin 36 with the inside of flange 14. Fins 36 provide a backup measure of attachment surety in the event that the interference engagement of stud body 34 and peripheral flange 14 fails to retain the window assembly and flange closely together. It will also be noted in FIG. 2 that a decorative molding 46 has been added to the heads of pins 42. This is, of course, not necessary to the practice of the invention, but may be aesthetically desirable. Pins 42 could, if desired, be entirely removed after insertion of the studs is complete. In this event molding 46 would conceal passages 38 from view.

The structure of the invention provides advantages other than the ease of attachment described above. A stud molded integrally from the same material as the molded frame is less expensive than a separate clip or metal stud molded thereto. Such a fastener avoids metal to metal contact and is rattle free. The resilience of the PVC material also provides a certain amount of play or tolerance in the alignment of studs with pinchweld slots. It will also be understood that should it be necessary to remove the window assembly, a PVC stud would be easier to sever or otherwise remove by a service operator than would a metal clip, nut or other fastener. The passages left in the frame by the removal of the push pins could be used for the insertion of a separate fastener, such as a threaded screw or bolt, for reattachment of the window assembly. Furthermore, pins 42 could be incorporated in a tool, such as a programmed robot, and removed from passages 38, after the window assembly has been installed. As before the passages 38 may be concealed by a decorative molding.

It will be understood that the invention is not to be limited to the exact embodiment disclosed and that certain variations thereof may be made without departing from the spirit of the invention.

The embodiments of the invention in which an exclusive property or privilege is claimed are defined as follows:

1. A modular window assembly and combined fastening system for closing a window opening in a body, said body having a rigid peripheral flange integral with said body and defining said window opening, said peripheral flange having at least one flange opening therethrough that has a fixed dimension, said window assembly comprising in combination:

a window panel, a molded frame of resilient plastic material substantially surrounding the peripheral edge of the window panel and having an outer surface accessible from outside the vehicle, and an undersurface engageable with at least a portion of the peripheral flange near the flange opening, said molded frame further including at least one substantially resilient stud molded integrally with its undersurface and having, in its original shape, an elongate configuration with a dimension slightly greater than the fixed dimension of the flange opening, said molded frame further including a passage therein passing from the outer surface substantially, but not completely, through the length of the molded stud to a closed end, and a push pin insertable into the passage and movable therewithin against said closed end, said pin having a head spaced from said molded frame outer surface by a predetermined amount, whereby the assembly may be positioned adjacent the window opening with the stud aligned with the flange opening and the stud elongated by pushing the pin head from outside the vehicle, said pin head then cooperating with said molded frame by contacting said molded frame outer surface after moving said predetermined amount, said predetermined amount being sufficient to further elongate the stud so as to decrease its stud dimension with respect to the fixed dimension of the flange opening so that the stud may pass through the flange opening until the frame undersurface engages the flange, the stud returning substantially to its original shape when it is not being elongated to grip the flange at the flange opening and thereby cooperate with the flange opening to hold the molded frame to the vehicle body.

2. A modular window assembly for closing an opening in a body, said body having a rigid pinchweld flange integral with said body and defining said window opening, said pinchweld flange having an outer and an inner surface and at least one flange opening therethrough that has a fixed dimension, comprising in combination:
- a window panel,
- a frame of resilient plastic material molded to the peripheral edge of the window panel and having an outer surface and an inner surface engageable with the outer surface of the pinchweld flange, said outer surface further including a peripheral groove having a bottom portion,
- said frame including a substantially cylindrical integral stud having, in its original shape, a diameter slightly greater than the fixed dimension of the flange opening, said stud extending inwardly from the inner surface of said frame, said stud including a passage therethrough extending to a closed inner end wall and through said peripheral groove bottom portion to the outer surface of said frame, said stud further including a series of axially spaced flexible integral fins on the outer surface thereof,
- a rigid member insertable into said passage, said rigid member having a head spaced from said bottom portion of said peripheral groove by a predetermined amount,
- said stud being elongated by forcing said rigid member in the passage thereof against said end wall, said rigid member head then cooperating with said peripheral groove bottom portion by contacting said bottom portion after moving said predetermined amount, said predetermined amount being sufficient to decrease the effective diameter of the stud and of the fins and allow the stud and fins to be inserted through the opening in the body pinchweld flange so that the inner surface of the frame can engage the outer surface of the pinchweld flange and one of the fins of the stud can engage the inner surface of the pinchweld flange, thereby cooperating with the pinchweld flange and flange opening to retain the window assembly thereto, said stud returning substantially to its original shape when it is not being elongated, and said rigid member head also returning to said predetermined spacing from said peripheral groove bottom portion, and,
- a peripheral molding sized to fit within said peripheral groove, said rigid member head also cooperatively providing a means to retain said molding in said peripheral groove.

* * * * *